US012752543B2

(12) United States Patent
Kawamura

(10) Patent No.: US 12,752,543 B2
(45) Date of Patent: Oct. 6, 2026

(54) PACKAGING FORM FOR PACKAGING LIQUID EJECTION HEAD

(71) Applicant: CANON KABUSHIKI KAISHA, Tokyo (JP)

(72) Inventor: Shogo Kawamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 18/679,241

(22) Filed: May 30, 2024

(65) Prior Publication Data

US 2024/0408880 A1 Dec. 12, 2024

(30) Foreign Application Priority Data

Jun. 9, 2023 (JP) ................................ 2023-095765

(51) Int. Cl.
*B41J 2/175* (2006.01)

(52) U.S. Cl.
CPC ......... *B41J 2/17533* (2013.01); *B41J 2/1754* (2013.01)

(58) Field of Classification Search
CPC .. B41J 2/17533; B41J 2/1754; B41J 2/17503; B41J 2/17536; B41J 2/17553
See application file for complete search history.

(56) References Cited

U.S. PATENT DOCUMENTS 5,596,388 A 1/1997 Ohkubo et al. ............... 399/111

FOREIGN PATENT DOCUMENTS

EP 0761450 A2 * 3/1997 .......... B41J 2/17533
JP H07-72781 3/1995

OTHER PUBLICATIONS

Yamazaki, Tsutomu, "Ink Cartridge Package and Packaging Method" (EP 0761450 A2), Mar. 12, 1997, [col. 2 line 1—col. 4 line 47] (Year: 1997).*

* cited by examiner

*Primary Examiner* — Lisa Solomon
(74) *Attorney, Agent, or Firm* — Venable LLP

(57) ABSTRACT

A packaging form for packaging a liquid ejection head equipped with a detachably attachable protective member, the packaging form including: the protective member configured to cover an ejection port surface of the liquid ejection head; cushioning material configured to be mounted on both ends of the liquid ejection head in a longitudinal direction; and a bag member configured to package the liquid ejection head, wherein the liquid ejection head, the protective member, and the cushioning material fixed together are contained inside the bag member and sealed in a depressurized state.

14 Claims, 16 Drawing Sheets

PACKAGING FORM FOR PACKAGING LIQUID EJECTION HEAD

BACKGROUND OF THE INVENTION

Field of the Invention

The present disclosure relates to a packaging form for packaging a liquid ejection head, in which a liquid ejection head to be used in a liquid ejection apparatus is contained in a container bag.

Description of the Related Art

Liquid ejection apparatuses include the serial scan type, which performs recording operations while moving the carriage, and the page-wide type, which uses a liquid ejection head with a size corresponding to the width of a recording medium and performs recording operations while the carriage is fixed and only the recording medium is conveyed. For transporting a liquid ejection head, a protective member covering the entire surface of the print chip is mounted to the liquid ejection head to prevent damage or soiling of the print chip, and the liquid ejection head with the protective member mounted is contained in a container bag and put inside a cardboard box with cushioning material. As an example of such a container bag, Japanese Patent Laid-Open No. H7-72781 (referred to as Document 1) describes containing a toner cartridge in a container bag with a zipper member for transporting the toner cartridge. Then, after being contained in this bag, the cartridge in Document 1 is held from both the left and the right sides by cushioning material such as Styrofoam and packed in a cardboard box.

However, it is necessary that the protective member mounted to the liquid ejection head does not come off from the liquid ejection head during packaging, transportation, and the like. The container bag disclosed in Document 1 does not require a protective member as in the case of the liquid ejection head in the first place, and thus does not anticipate that the protective member becomes unmounted from the liquid ejection head.

SUMMARY OF THE INVENTION

A packaging form for packaging a liquid ejection head of the present disclosure is a packaging form for packaging a liquid ejection head equipped with a detachably attachable protective member, the packaging form including: the protective member configured to cover an ejection port surface of the liquid ejection head; cushioning material configured to be mounted on both ends of the liquid ejection head in a longitudinal direction; and a bag member configured to package the liquid ejection head, wherein the liquid ejection head, the protective member, and the cushioning material fixed together are contained inside the bag member and sealed in a depressurized state.

Further features of the present invention will become apparent from the following description of exemplary embodiments with reference to the attached drawings.

Figure 16A:
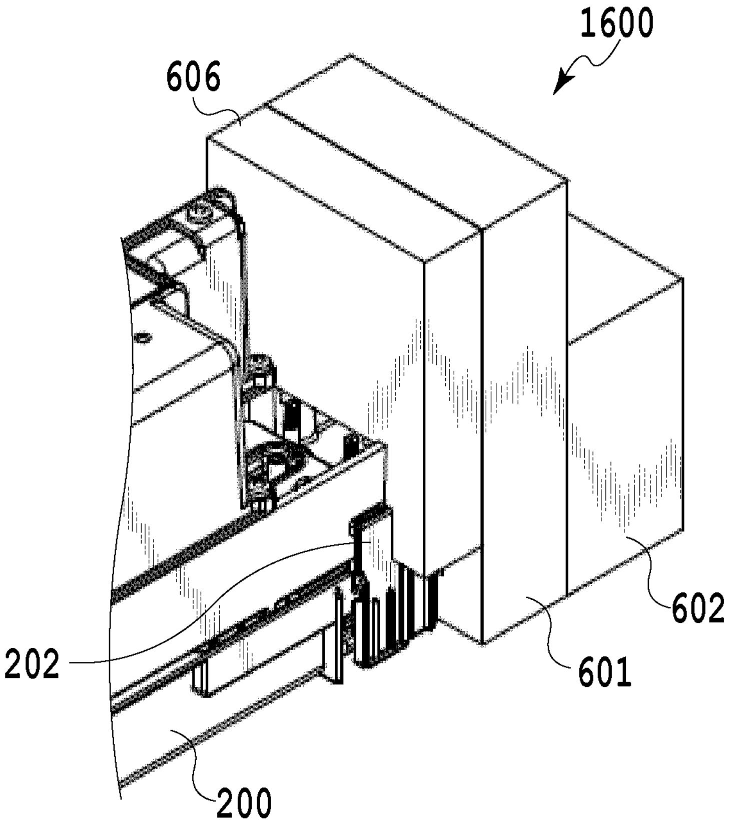
Figure 16B:
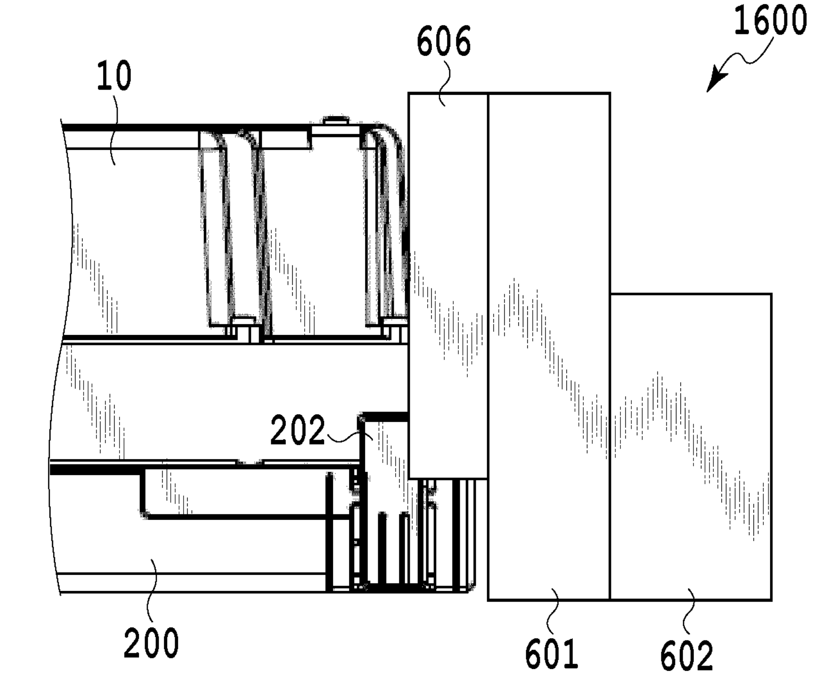

16A and FIG. 16B are a perspective view and a side view of a liquid ejection head and a mounted cushioning material in the second embodiment of the present disclosure.

DESCRIPTION OF THE EMBODIMENTS

First Embodiment

Hereinafter, an example of an embodiment of the present disclosure is explained with reference to the drawings.

(Liquid Ejection Head)

Figure 1:
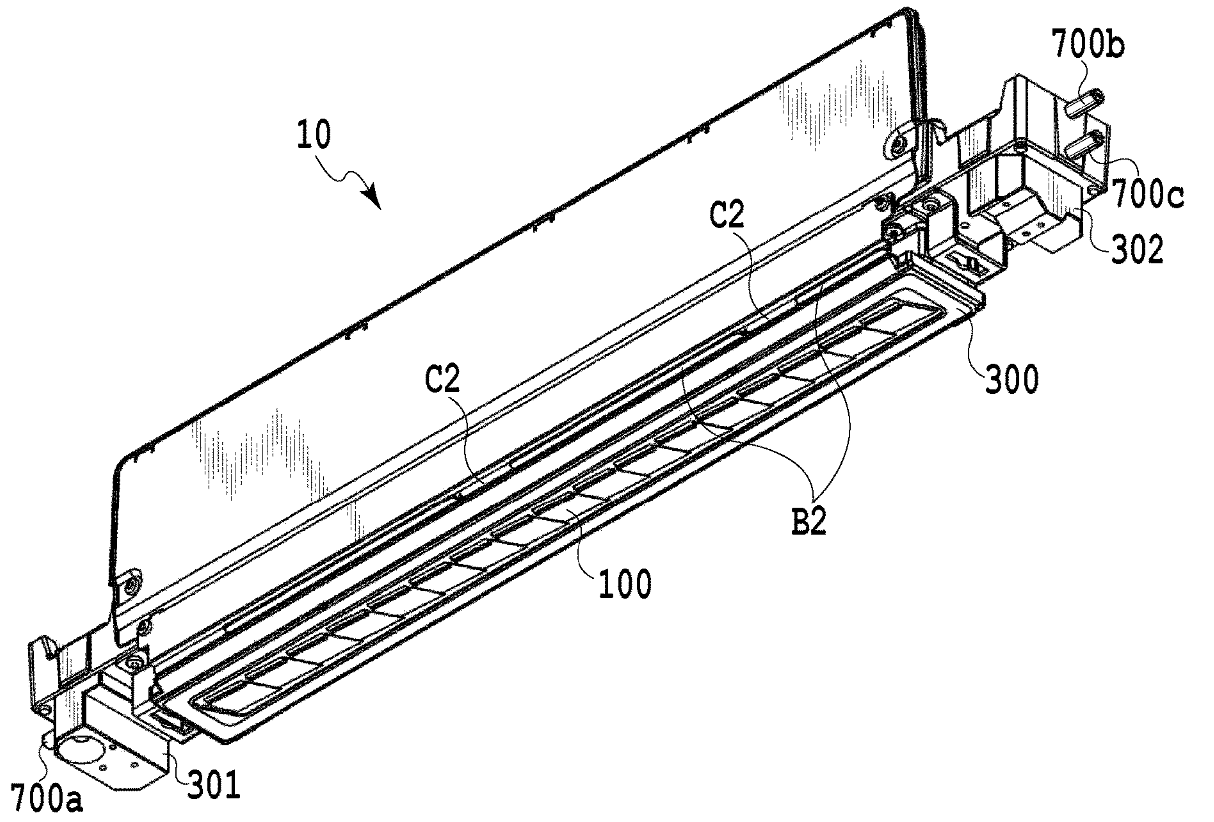
FIG. 1 is a perspective view of a liquid ejection head according to one embodiment of the present disclosure as seen from below.
Figure 2A:
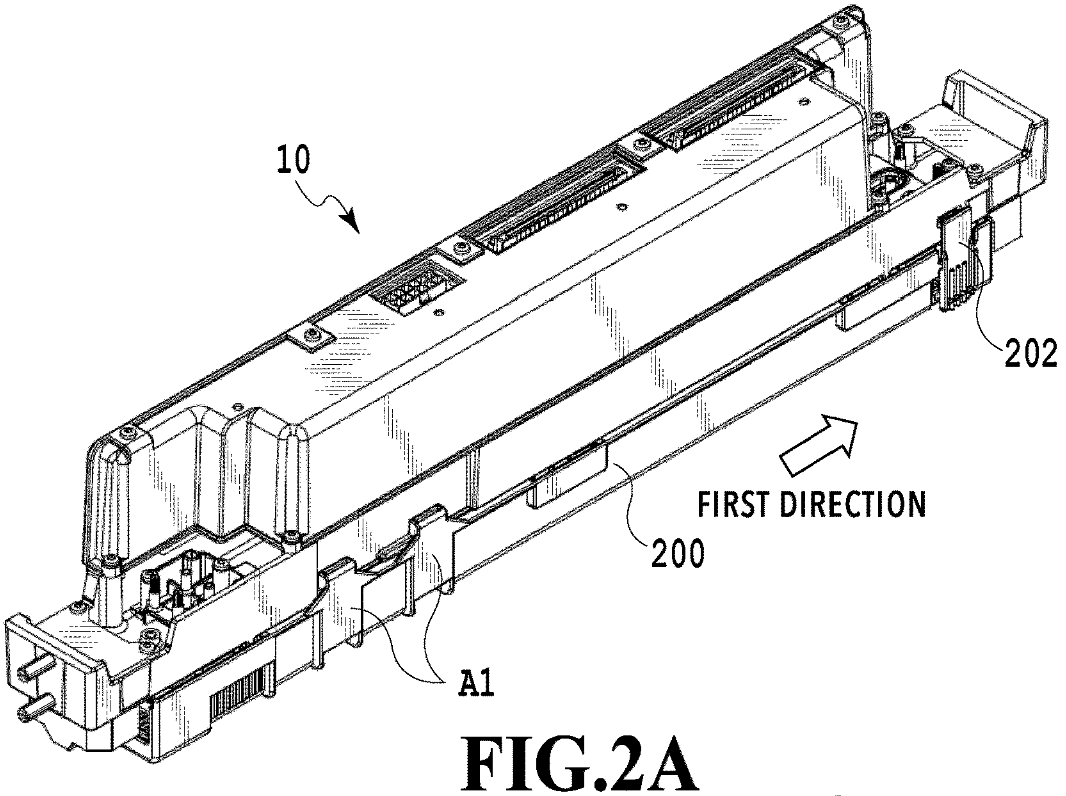
FIG. 2A and FIG. 2B are perspective views of the liquid ejection head according to one embodiment of the present disclosure as seen from above.
Figure 2B:
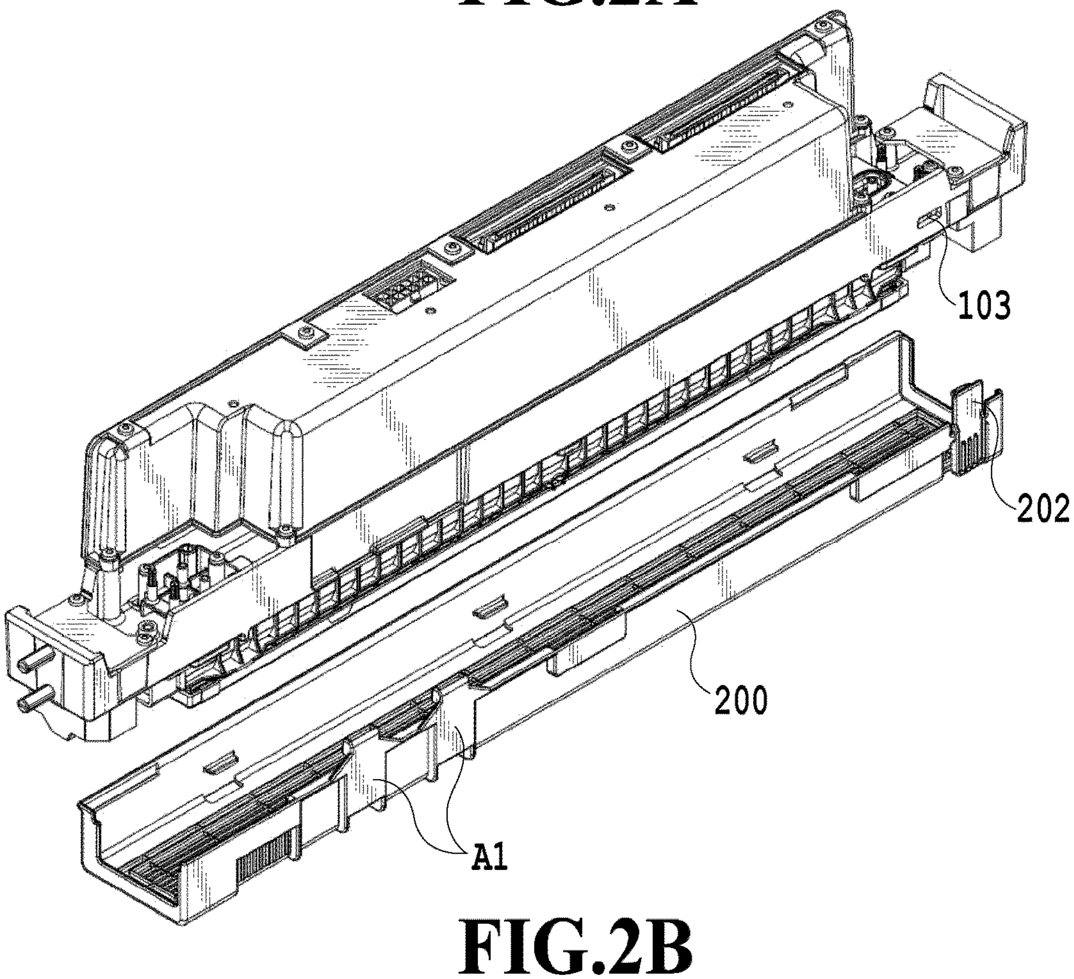
Figure 3:
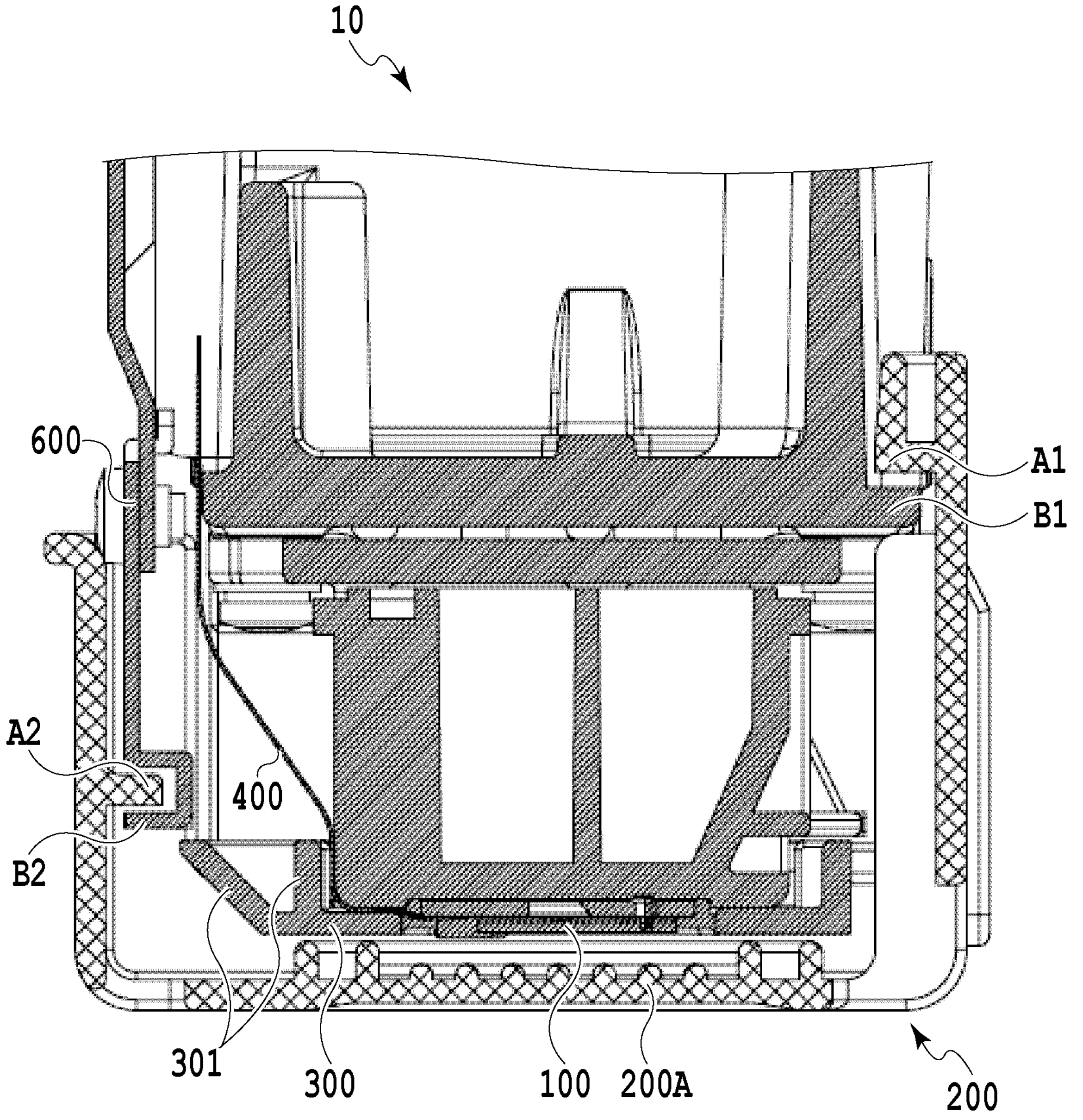
FIG. 3 is a schematic cross-sectional view of the liquid ejection head according to one embodiment of the present disclosure.
Figure 4:
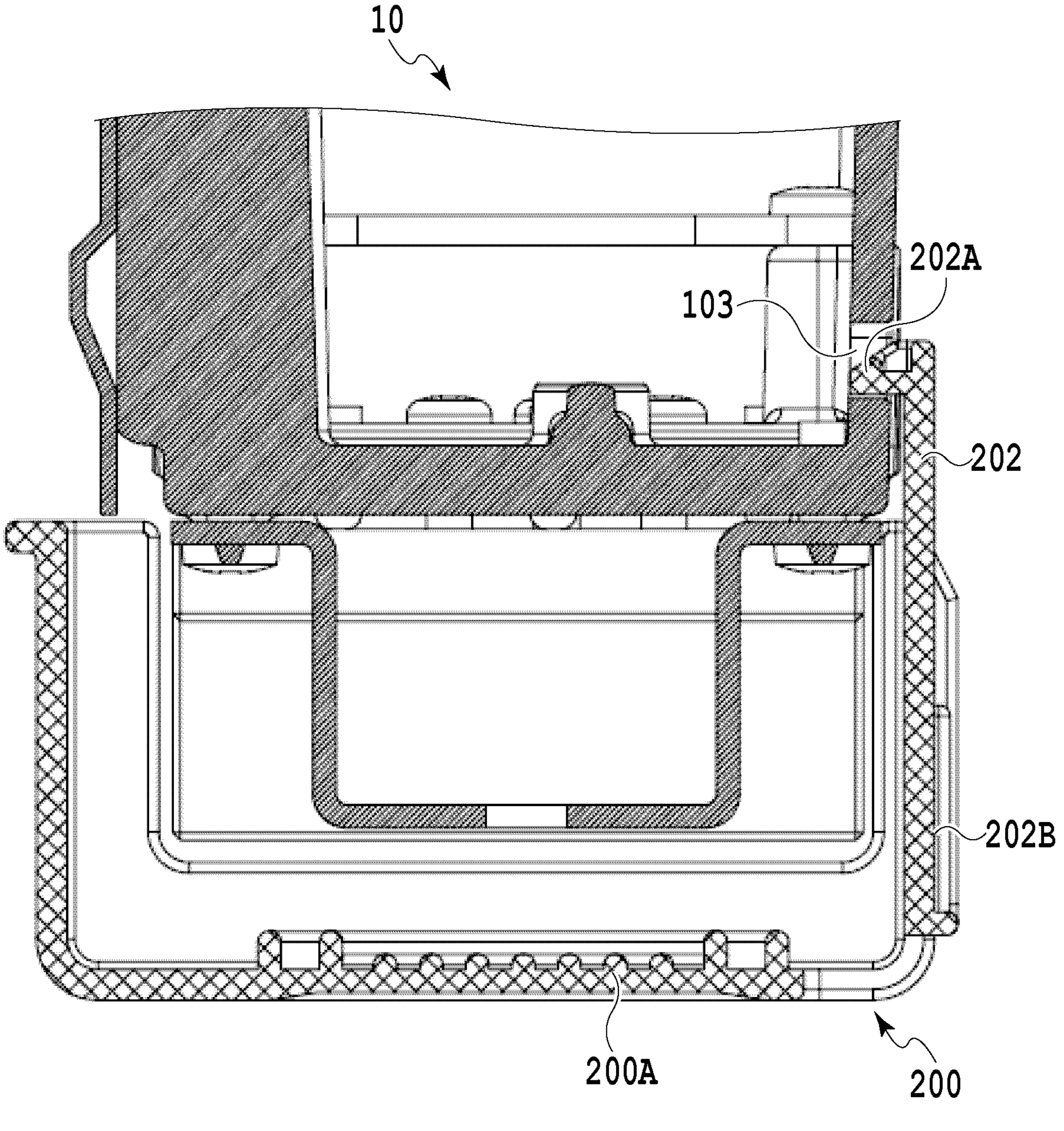
FIG. 4 is a schematic cross-sectional view of the liquid ejection head according to one embodiment of the present disclosure.
Figure 5:
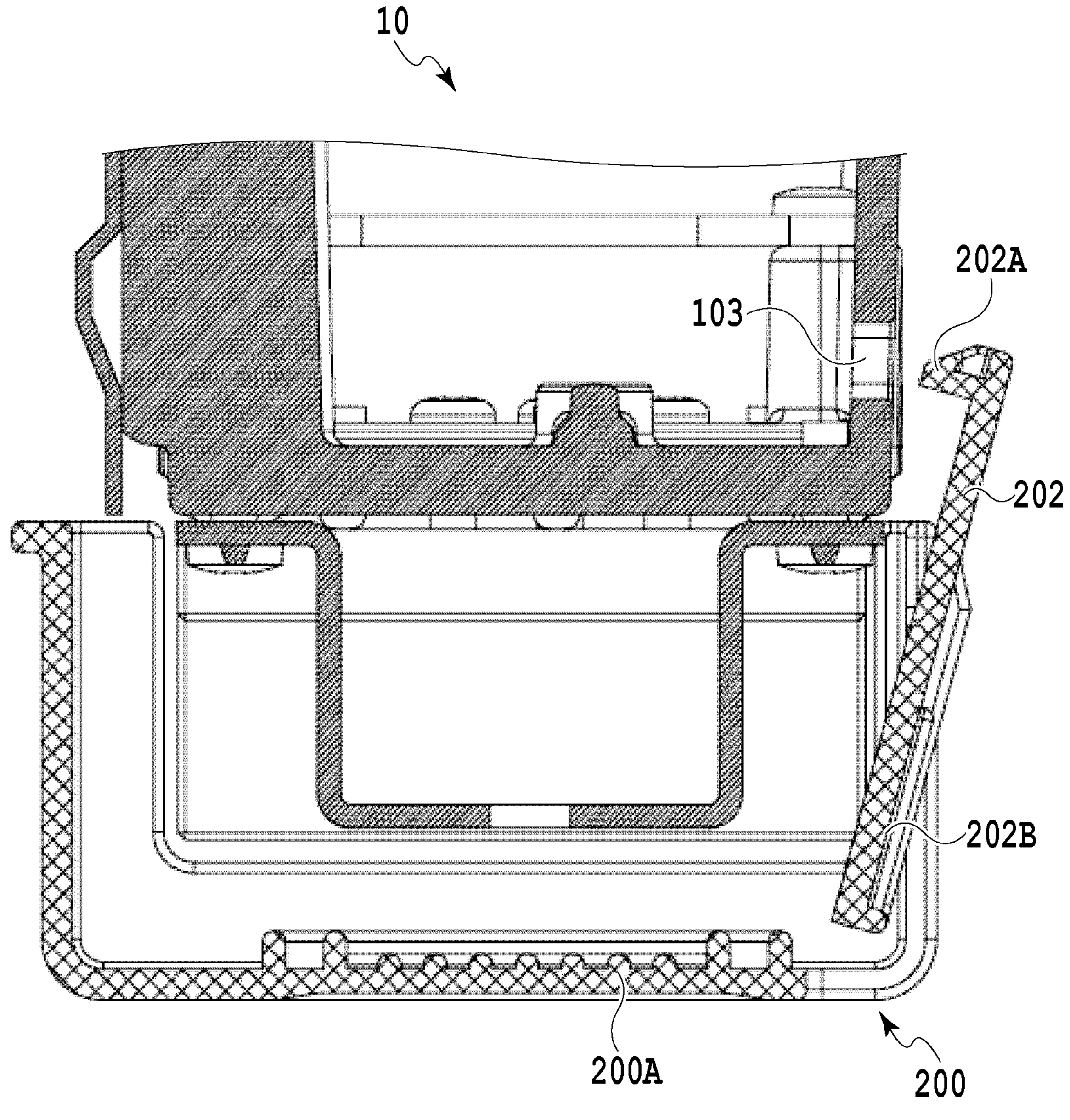
FIG. 5 is a schematic cross-sectional view of the liquid ejection head according to one embodiment of the present disclosure.

FIG. 1 is a perspective view of the liquid ejection head 10 according to one embodiment of the present disclosure as seen from below, and FIG. 2A and FIG. 2B are perspective views of the liquid ejection head 10 according to one embodiment of the present disclosure as seen from above. Further, FIG. 3 to FIG. 5 are respectively schematic cross-sectional views of the liquid ejection head 10 according to one embodiment of the present disclosure.

The liquid ejection head 10 according to one embodiment of the present disclosure is what is termed as a page-wide type head in which the recording element substrates 100 that eject liquid are arranged in the longitudinal direction. Further, as illustrated in FIG. 2A and FIG. 2B, the liquid ejection head 10 is mounted with the removable protective member 200 to prevent damage or soiling of the recording element substrates and the like during transportation or during attaching to and detaching from the apparatus. Note that, although the details of which are described later, with respect to attaching and detaching the protective member 200 to and from the liquid ejection head 10, the position where the engaging portions A1 and A2 of the protective member 200 are attached to the liquid ejection head 10 is referred to as the engagement position. Further, the position where the engaging portions A1 and A2 of the protective member 200 are located at the guide openings C1 and C2 of the liquid ejection head 10 is referred to as the release position.

As illustrated in FIG. 1, in the liquid ejection head 10 of the present disclosure, the multiple recording element substrates 100, each of which has ejection ports for ejecting liquid, are arranged in the longitudinal direction (the first direction X). These multiple recording element substrates 100 constitute the ejection surface of the liquid ejection head 10. Further, on the ejection surface of the liquid ejection head 10 of the present disclosure, the cap surface forming member 300 is formed so as to surround the periphery of the multiple recording element substrates 100. In the liquid ejection head 10, the pin 700*a* is installed at one end of the longitudinal direction of the liquid ejection head 10, and the pins 700*b* and 700*c* are installed at the other end. Further, the liquid ejection head 10 is equipped with the first positioning member 301 at one end of the liquid ejection head 10 on the lower side in the vertical direction. Furthermore, the liquid ejection head 10 is equipped with the second positioning member 302 at the other end of the liquid ejection head on the lower side in the vertical direction.

As illustrated in FIG. 2A and FIG. 2B, the protective member 200 is mounted to the liquid ejection head 10 in a detachably attachable manner. With respect to attaching/detaching this protective member 200, the liquid ejection head 10 is equipped with the two guide portions B2 and the two guide openings C2 along the first direction X. Further, the liquid ejection head 10 is also equipped with the two guide portions B1 (see FIG. 3) and the two guide openings C1 also along the first direction X, on the side not illustrated in FIG. 1. Meanwhile, the protective member 200 is equipped with the engaging portions A1 and A2 (see FIG. 3) which respectively engage with the guide portions B1 and B2 of the liquid ejection head 10. Further, the liquid ejection head 10 is equipped with the fixation opening 103 for fixing the protective member 200. In the present embodiment, the liquid ejection head 10 is formed with two of each of the guide portions and the guide openings, but there is no limitation as such and the liquid ejection head may be formed with one of each, or three or more of each.

In the above configuration for attaching/detaching, the guide portions B1 of the liquid ejection head 10 have, at one end in the first direction X, abutting portions for the engaging portions A1 of the protective member 200 to abut on. Further, with the liquid ejection head 10 and the protective member 200 in a fixed state, the other ends on the opposite side of the ends of the engaging portions A1 in the first direction are connected to the guide openings C1 of the liquid ejection head 10.

(Protective Member)

The protective member 200, by being mounted to the liquid ejection head 10, functions to inhibit damage and soiling of the recording element substrates and the like during transportation of the liquid ejection head or in the case of attaching/detaching the liquid ejection head to or from the apparatus. By attaching the liquid ejection head 10 to the apparatus in the state with the protective member 200 still being attached, and removing the protective member 200 afterwards, damage and soiling of the liquid ejection head 10 during replacement work can be prevented.

As illustrated in FIG. 3, the protective member 200 has the protective portion 200A that covers the ejection surface of the liquid ejection head 10. The protective member 200 has the two engaging portions A1 and A2 that are capable of engaging with the two guide portions B1 and B2 of the liquid ejection head 10 and that are smaller in length in the first direction X than the two guide openings C1 and C2. Further, the protective member 200 is engaged with the fixation opening 103 of the liquid ejection head 10 (see FIG. 4) at the engagement position where the two guide portions B1 and B2 of the liquid ejection head 10 and the two engaging portions A1 and A2 are engaged. Furthermore, regarding the protective member 200, its movement in the first direction X with respect to the liquid ejection head 10 is regulated at the engagement position where the two guide portions B1 and B2 of the liquid ejection head 10 engage with the two engaging portions A1 and A2. Further, the protective member 200 has at least one of the fixing portion 202 (see FIG. 4) that fixes the liquid ejection head 10 and the protective member 200.

In the present embodiment, as illustrated in FIG. 4, the protective member 200 is equipped with the two engaging portions A1 and A2 and the fixing portion 202 arranged in the third direction Z that intersects the first direction X and the second direction Y. Note that, in the present embodiment, the direction that planarly intersects the first direction X is the third direction Z, and the vertical direction is the second direction Y.

As illustrated in FIG. 4, the fixing portion 202 has a deformable shape and can be moved from the fixing position (the position in FIG. 4), where the fixing portion 202 engages with the fixation opening 103 to be fixed to the liquid ejection head 10, to the release position (the position in FIG. 5), where the fixation is released. In the present embodiment, the fixing portion 202 has the protruding portion 202A (see FIG. 3, etc.) on the upper side and the disengaging portion 202B (see FIG. 3, etc.) on the lower side, and is attached so at to be revolvable (rotatable) in the second direction Y. The fixing portion 202 is formed as an integral component of the protective member 200 and is supported by the rotational axis 202C (see FIG. 6, etc.). The fixing portion 202 may be formed of a resin material such as polypropylene. In the present embodiment, it is assumed that the fixing portion 202 is formed as an integral component of the protective member 200, but there is no limitation as such and the fixing portion 202 may be formed as a component separate from the protective member 200. In such a case, the fixing portion 202 may be formed of filler-containing resin, metal, or the like. Furthermore, the shape of the fixing portion can be any shape that allows the protective member and the liquid ejection head to be fixed. The fixing portion may be formed of a member capable of expansion and contraction and equipped with a protruding portion at the tip, where the protruding portion engages with the fixation opening 103 of the liquid ejection head to be fixed.

The protective member 200 is attached to the liquid ejection head 10 by engagement of the guide portions B1 with the engaging portions A1 and by engagement of the guide portions B2 with the engaging portions A2 and by fixing of the fixation opening 103 with the fixing portion 202

(see FIG. 4). In the present embodiment, it is assumed that the fixation opening 103 and the fixing portion 202 are formed at end portions of the liquid ejection head 10 and the protective member 200, but there is no limitation as such and any positions where the fixing portion 202 and the fixation opening 103 can be engaged/disengaged are sufficient.

(Method of Removing the Protective Member)

The method of removing the protective member 200 from the liquid ejection head 10 equipped with the protective member 200 is hereinafter described.

Figure 6A:
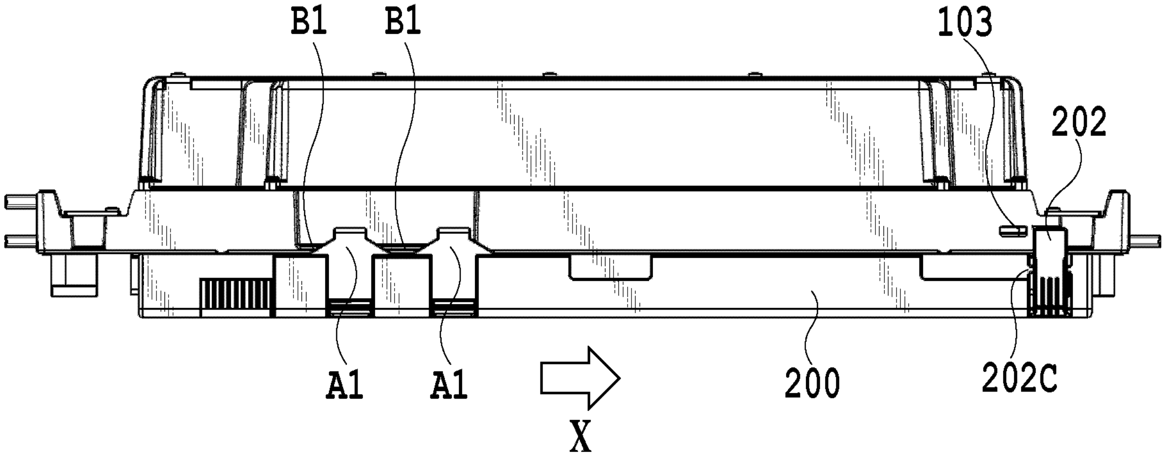
FIG. 6A and FIG. 6B are explanatory diagrams illustrating a procedure for removing a protective member from the liquid ejection head according to one embodiment of the present disclosure.
Figure 6B:
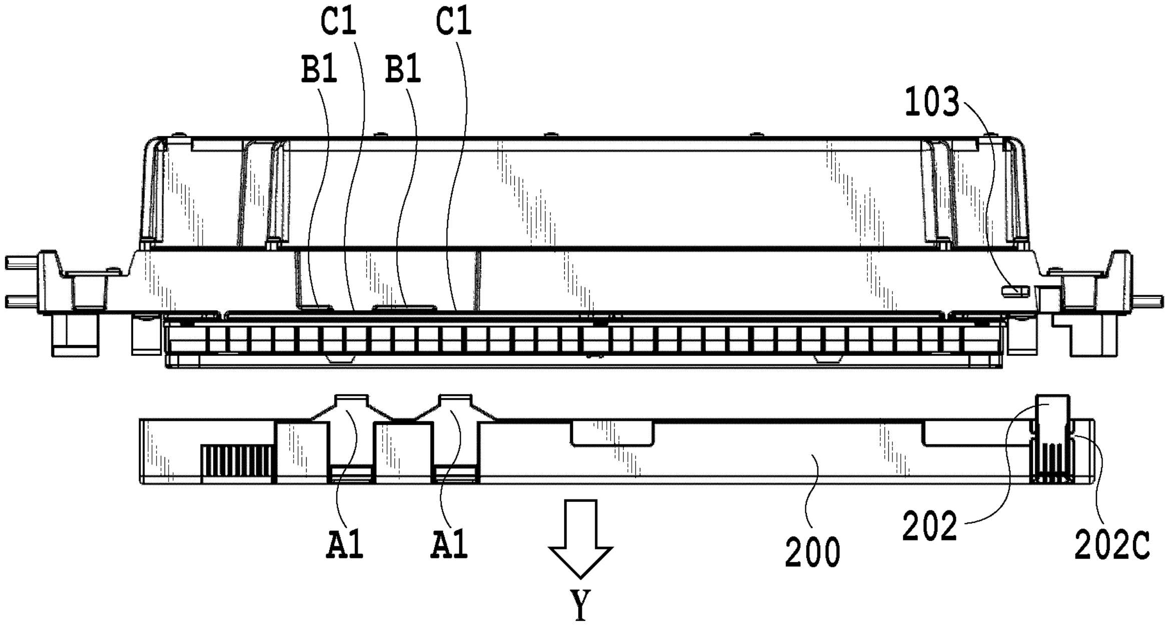

FIG. 6A and FIG. 6B are diagrams illustrating the procedure for removing the protective member 200 from the liquid ejection head 10 according to one embodiment of the present disclosure. Regarding the removal of the protective member 200 from the liquid ejection head 10, as illustrated in FIG. 5, the disengaging portion 202B of the fixing portion 202 is moved (revolved) by being pushed, which causes the protruding portion 202A to be moved (revolved). The movement (revolving) of the protruding portion 202A releases the engagement between the fixation opening 103 and the protruding portion 202A. Accordingly, as illustrated in FIG. 6A, the protective member 200 is configured to be movable in the first direction X.

Next, the fixing portion 202 is released from the fixation opening 103 by the user's operation, and the protective member 200 is moved from the engagement position by a predetermined amount in the first direction X to the release position where engagement of the guide portions B1 with the engaging portions A1 is released (see FIG. 6A). By moving the protective member 200 in the second direction Y which intersects the first direction X so that the engaging portions A1 are moved to the positions of the guide openings C1 as illustrated in FIG. 6B, the protective member 200 is removed from the liquid ejection head 10.

(Liquid Ejection Apparatus)

Figure 7:
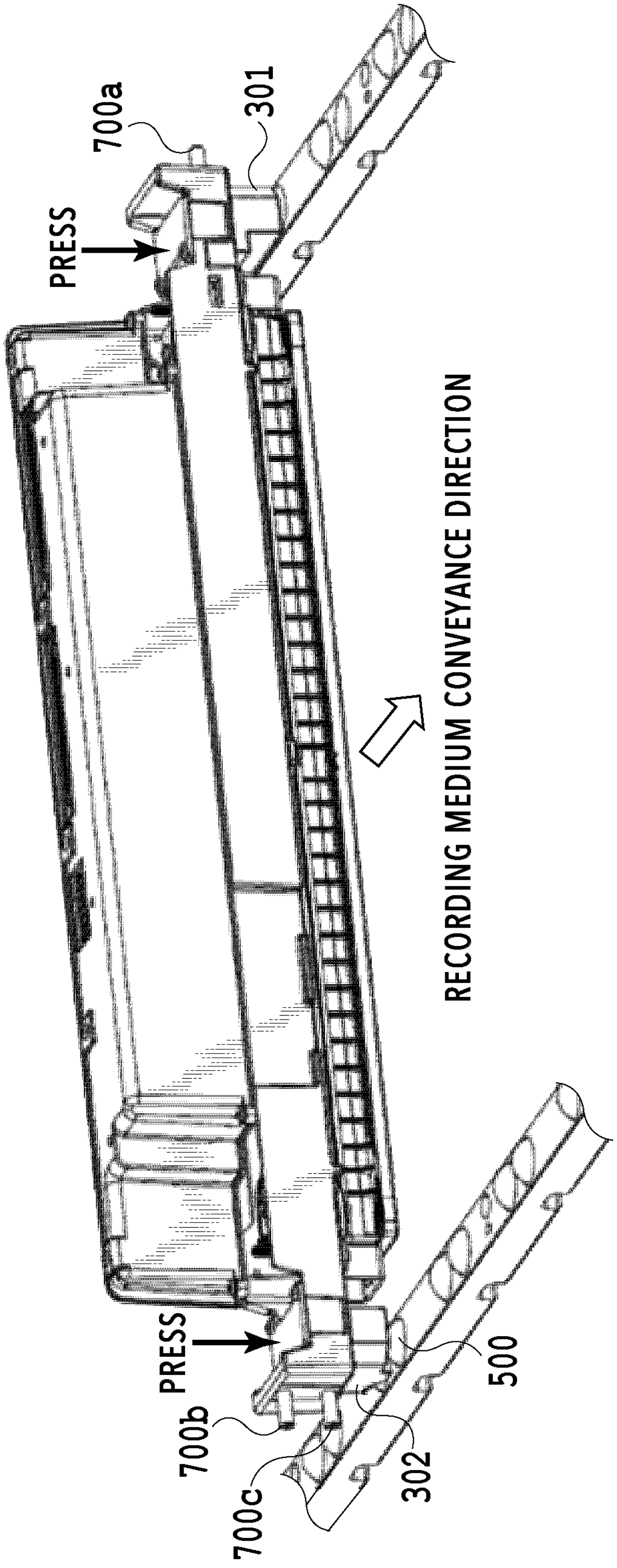
FIG. 7 is a schematic perspective view of a state where the liquid ejection head is mounted on a liquid ejection apparatus according to one embodiment of the present disclosure.

FIG. 7 is a schematic perspective view of a state where the liquid ejection head 10 is mounted on the liquid ejection apparatus of the present embodiment.

The liquid ejection apparatus is equipped with a frame, the spheres 500 for positioning the liquid ejection head 10, and holding portions (not illustrated in the drawings) that hold the pins 700*a*, 700*b*, and 700*c* of the liquid ejection head 10. The liquid ejection head 10 is configured detachably attachable to the liquid ejection apparatus, and if the liquid ejection head 10 is attached to the liquid ejection apparatus, the pins 700*a*, 700*b*, and 700*c* are each held by the holding portions of the liquid ejection apparatus. Furthermore, the liquid ejection head 10 is lowered onto the spheres 500, so that the first positioning member 301 and the second positioning member 302 of the liquid ejection head 10 are each positioned and held by the spheres 500. The liquid ejection head 10 of the present embodiment ejects liquid from the recording element substrates 100 onto the recording medium being conveyed from the downstream side in the conveyance direction to perform recording.

Figure 8:
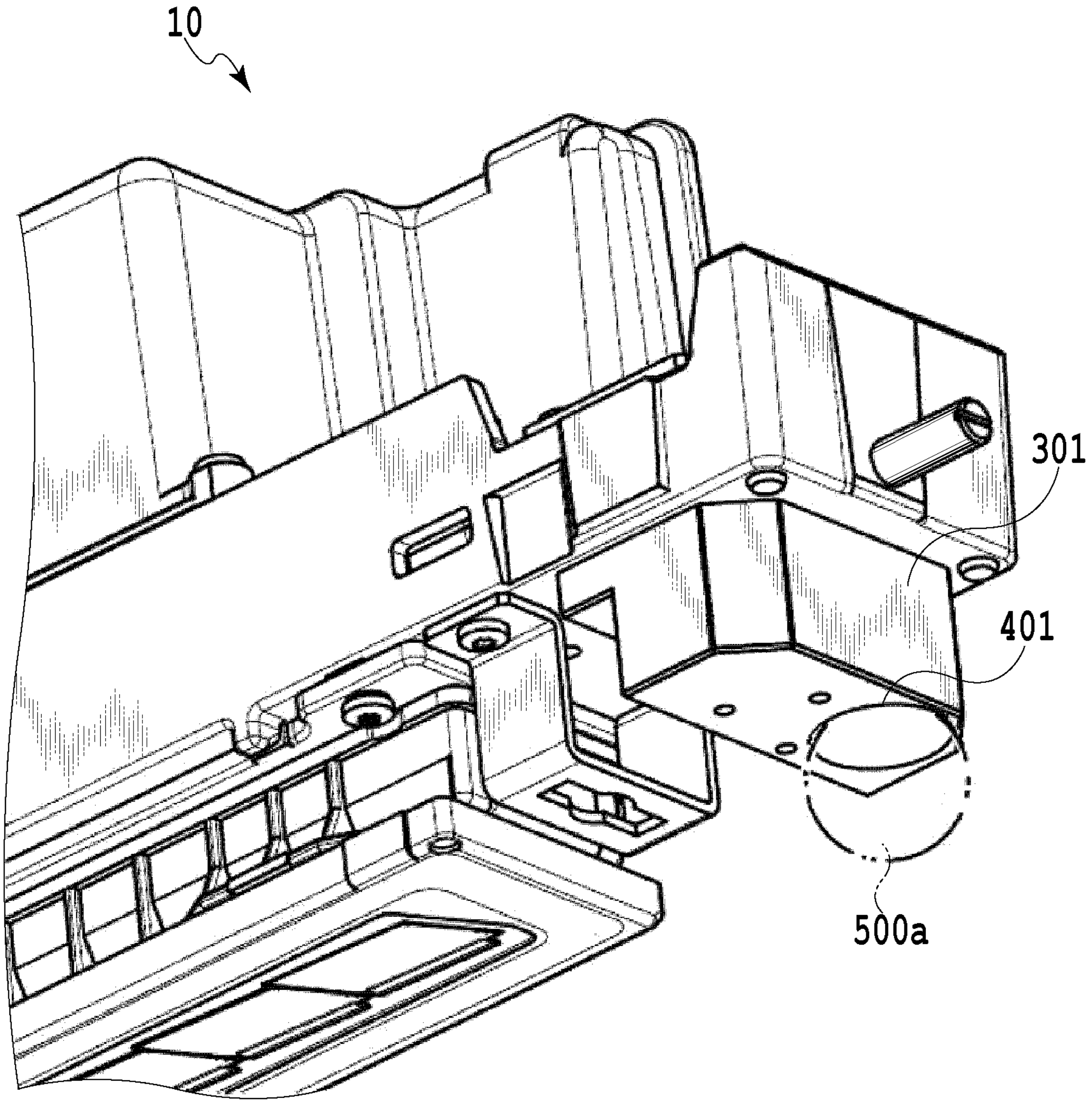
FIG. 8 is a partially enlarged view illustrating one end of the liquid ejection head according to one embodiment of the present disclosure.
Figure 9:
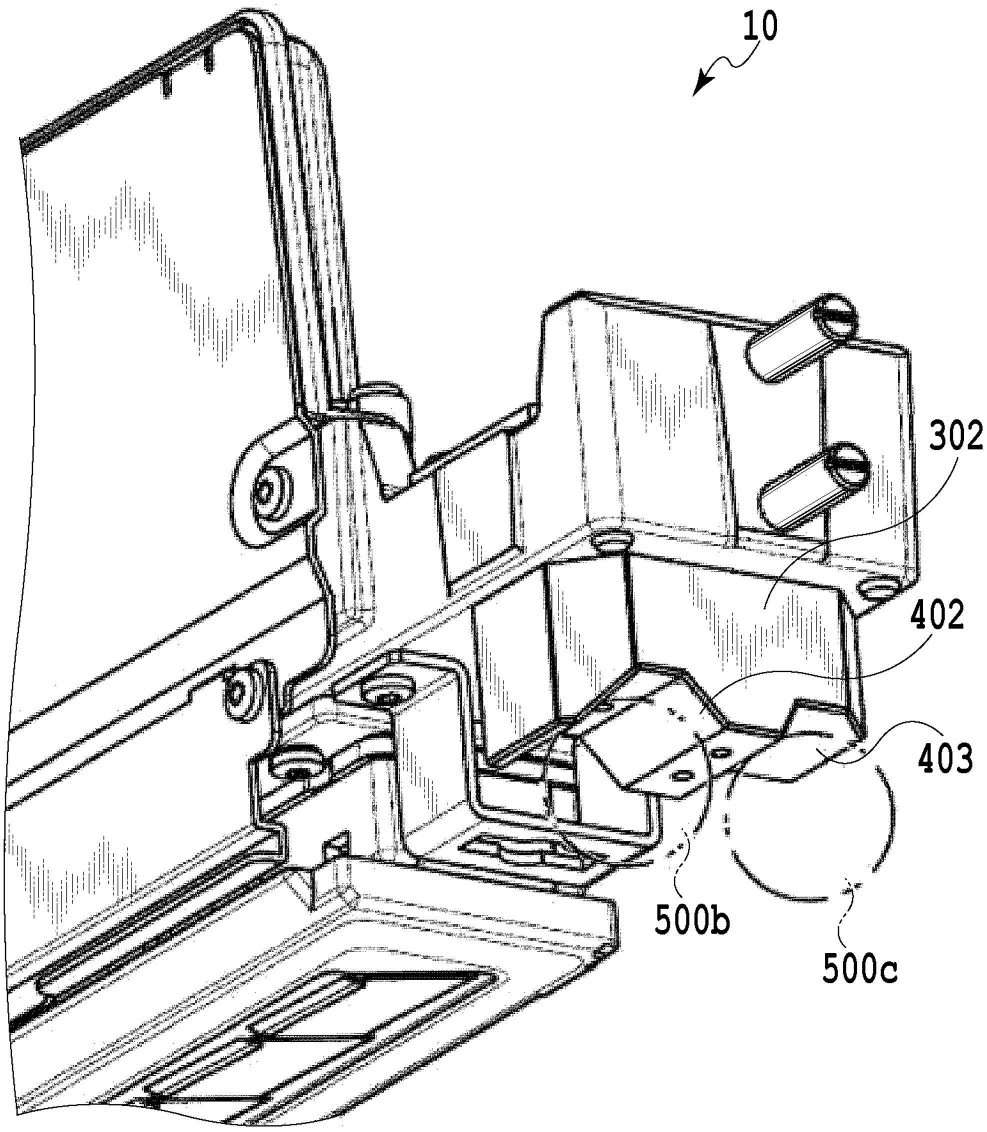
FIG. 9 is a partially enlarged view illustrating the other end of the liquid ejection head according to one embodiment of the present disclosure.

FIG. 8 is a partially enlarged view illustrating one end of the liquid ejection head 10 according to the present embodiment, and FIG. 9 is a partially enlarged view illustrating the other end of the liquid ejection head 10 according to the present embodiment. The first positioning member 301 of the liquid ejection head 10 has the conically shaped recessed portion 401 in a downward orientation in the vertical direction. The conical recessed portion 401 is centered on the sphere 500*a* for engagement. This allows the three translational degrees of freedom (the X/Y/Z directions in the drawing) of one end of the liquid ejection head 10 to be fixed. Further, the second positioning member 302 of the liquid ejection head 10 has the two tapered recessed portions 402 and 403, as illustrated in FIG. 9. The recessed portion 402 fixes the rotational degree of freedom with the axis corresponding to the normal line of the plane constituting the recording element substrates 100 (the rotation about the Z-axis) and the rotational degree of freedom with the axis corresponding to the normal line of the longitudinal direction of the liquid ejection head (the rotation about the X-axis) by abutting on the sphere 500*b*. The recessed portion 403 of the second positioning member 302 fixes the rotational degree of freedom of the axis corresponding to the longitudinal direction of the liquid ejection head 10 (the rotation about the Y-axis) by engaging with the sphere 500*c*.

Thus, one end and the other end of the liquid ejection head 10 can be fixed by engaging with the respective spheres.

Figure 10A:
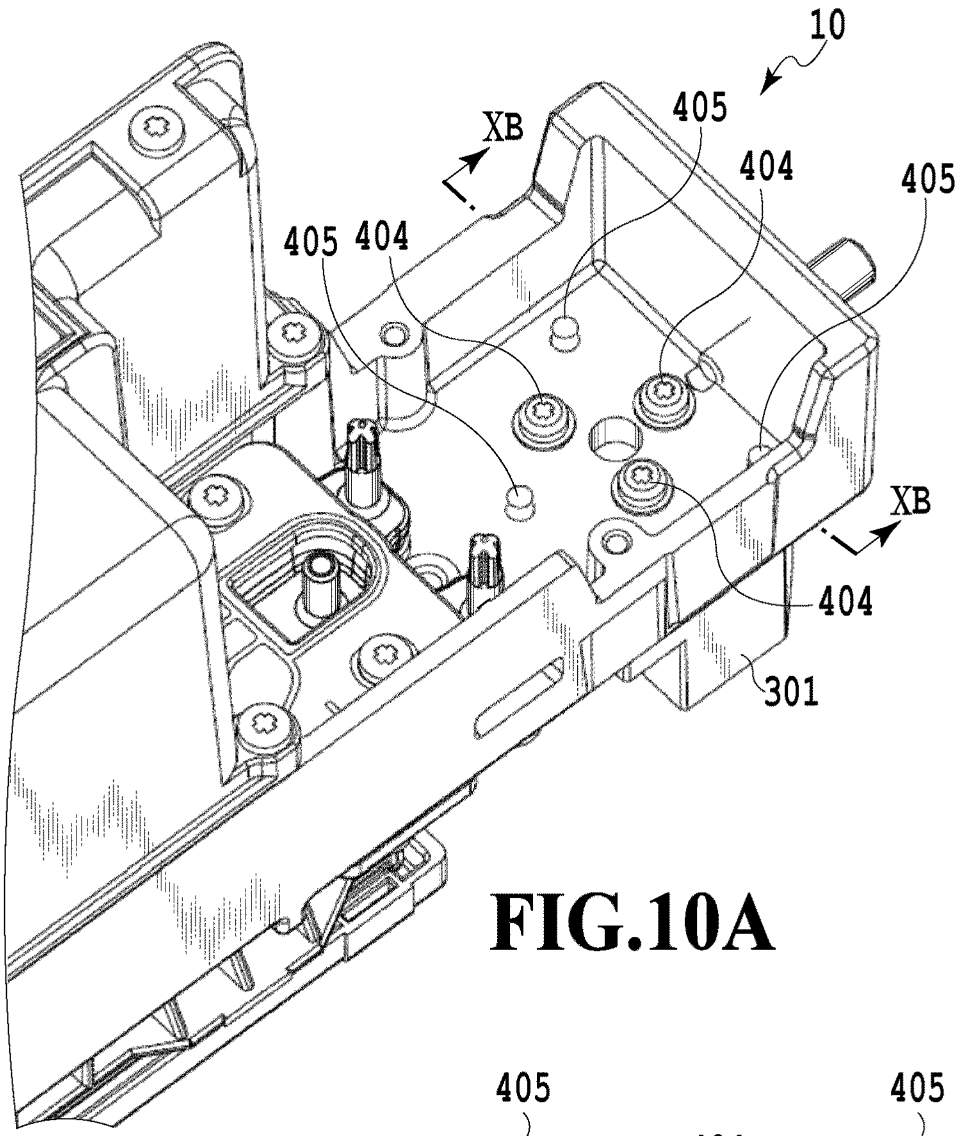
FIG. 10A and FIG. 10B are perspective views of one end of the liquid ejection head according to one embodiment of the present disclosure as seen from above.
Figure 10B:
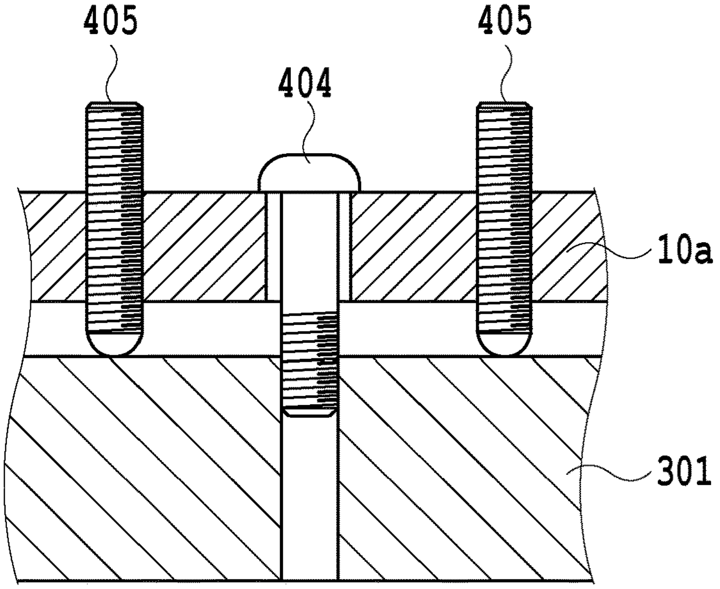

FIG. 10A is a perspective view of one end of the liquid ejection head 10 according to the present embodiment as seen from above. FIG. 10B is a schematic cross-sectional view taken along the line XB-XB of FIG. 10A. The first positioning member 301 is fixed in a state arranged in relation to the recording element substrates, but in a case where the fixing method is by the fixing screws 404 as in the present embodiment, it is necessary to regulate the Z direction.

Therefore, as illustrated in FIG. 10A, one end of the liquid ejection head 10 is equipped with the three fixing screws 404 to fix the liquid ejection head main body 10*a* to the first positioning member 301, and the three adjustment screws 405 to adjust the height of the liquid ejection head 10 in the Z direction. The liquid ejection head 10 can be regulated in the X and Y directions by screw fixation with the first positioning member 301 in a regulated state. The liquid ejection head 10 can be regulated in the Z direction by adjusting the adjustment screws 405, and can be attached with high accuracy by screw fixation.

<Packaging of the Liquid Ejection Head>

Figure 11:
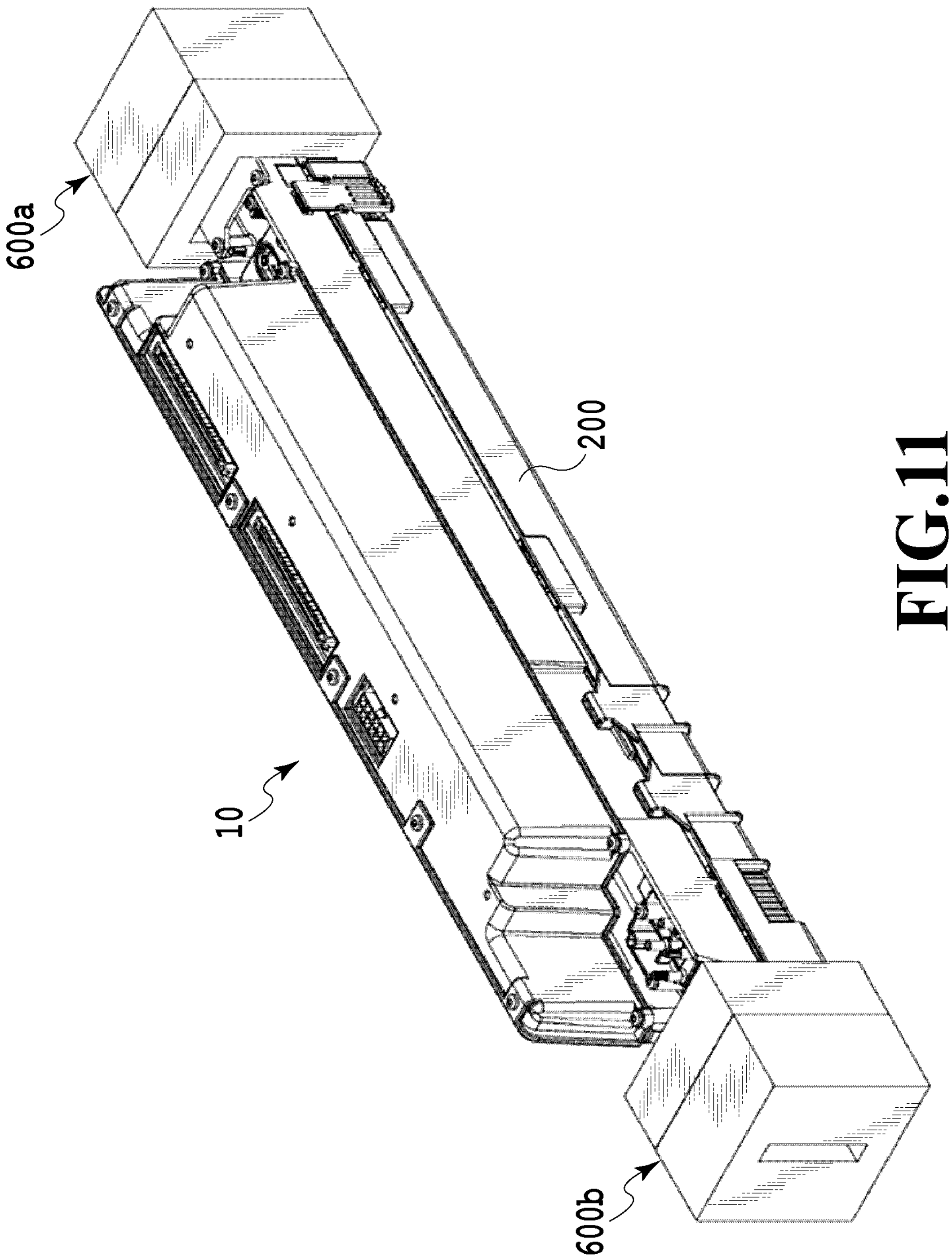
FIG. 11 is a perspective view of the liquid ejection head according to one embodiment of the present disclosure with cushioning materials attached to one end and the other end.
Figure 12:
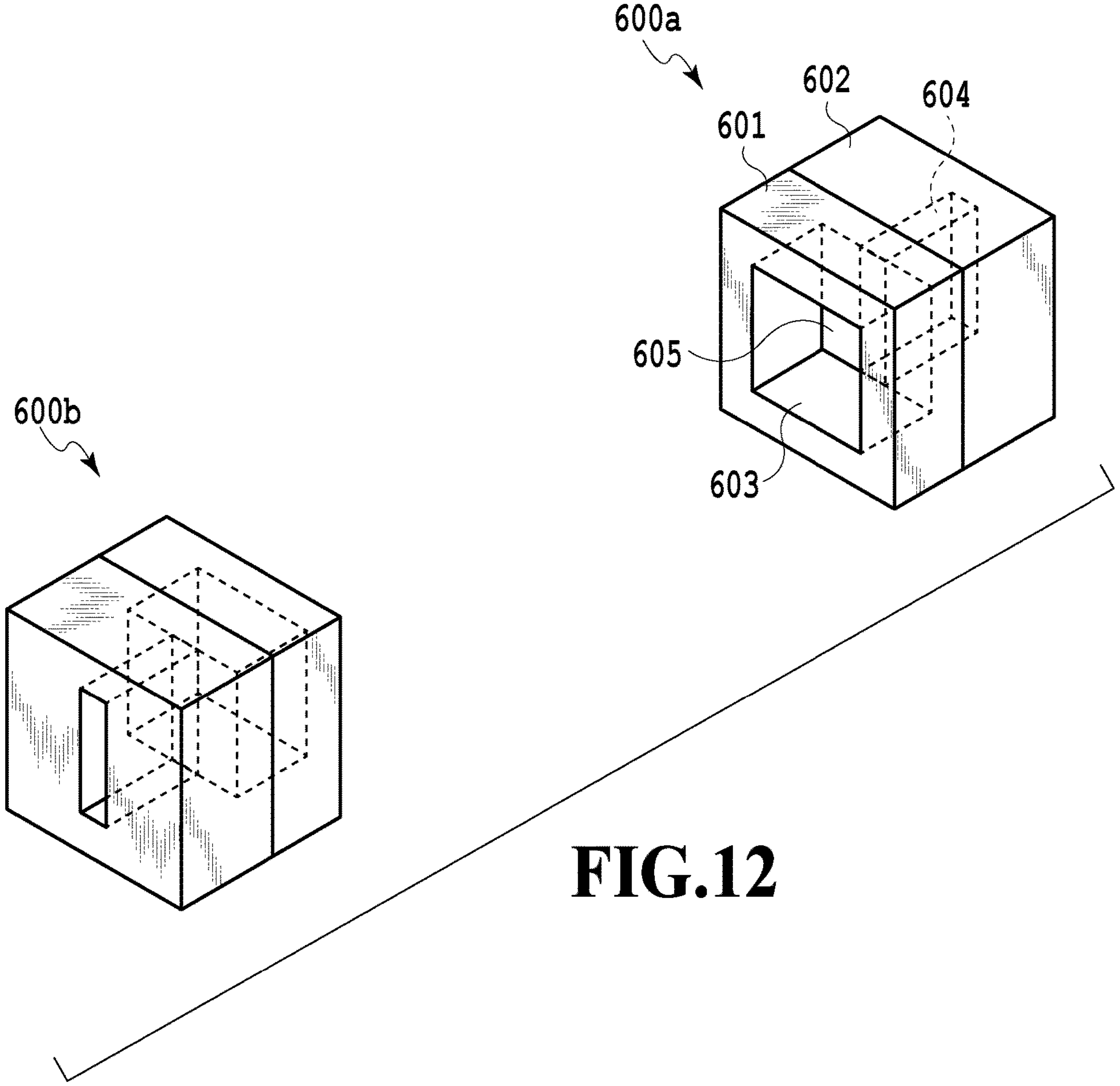
FIG. 12 is an oblique perspective view of the cushioning materials of the liquid ejection head of one embodiment of the present disclosure.

FIG. 11 is a perspective view of the liquid ejection head 10 of one embodiment of the present disclosure with cushioning material attached to one end and the other end. FIG. 12 is an oblique perspective view of the cushioning material according to one embodiment of the present disclosure.

As described above, the present embodiment is a packaging form in which the liquid ejection head 10 is contained in a container bag. At this time, the protective member 200 is mounted on the liquid ejection head 10. Furthermore, the cushioning materials 600*a* and 600*b* are each mounted on the liquid ejection head 10 at positions that sandwich the protective member 200 and regulate the removal of the protective member 200. As illustrated in FIG. 12, the cushioning material 600*a* is configured with the first member 601 and the second member 602 bonded to each other by thermal welding. The first member 601 has the first through hole 603 with a shape that corresponds to the shape of one end of the liquid ejection head 10 and can receive this one end. On the other hand, the second member 602 has the second through hole 604 that corresponds to the shape of the pin 700*a* protruding further from the one end of the liquid ejection head 10 and can receive this pin. The second member 602 also has the contacting surface 605, facing the first through hole 603, with which the one end of the liquid ejection head 10 received in the first through hole 603 is made contact. The cushioning material 600*b*, which is mounted to the end portion on the opposite side of the liquid ejection head 10, has the same shape as the cushioning material 600*a* and is mounted to the other end of the liquid ejection head 10.

The material used for the cushioning materials 600*a* and 600*b* may be, for example, polyethylene-based foam. This allows the two members to be bonded and formed by thermal welding. In the present embodiment, a cushioning material consisting of two members bonded together is used, but a cushioning material that is formed as one piece and has each of the above mentioned through holes may also be used.

Figure 13A:
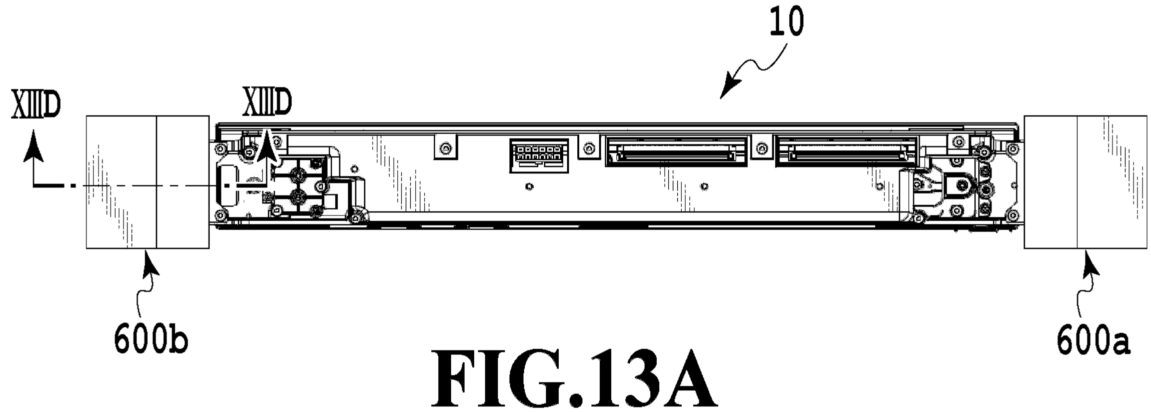
FIG. 13A to FIG. 13D are a top view, a side view, and cross-sectional views of the liquid ejection head according to one embodiment of the present disclosure with the cushioning materials attached to one end and the other.
Figure 13B:
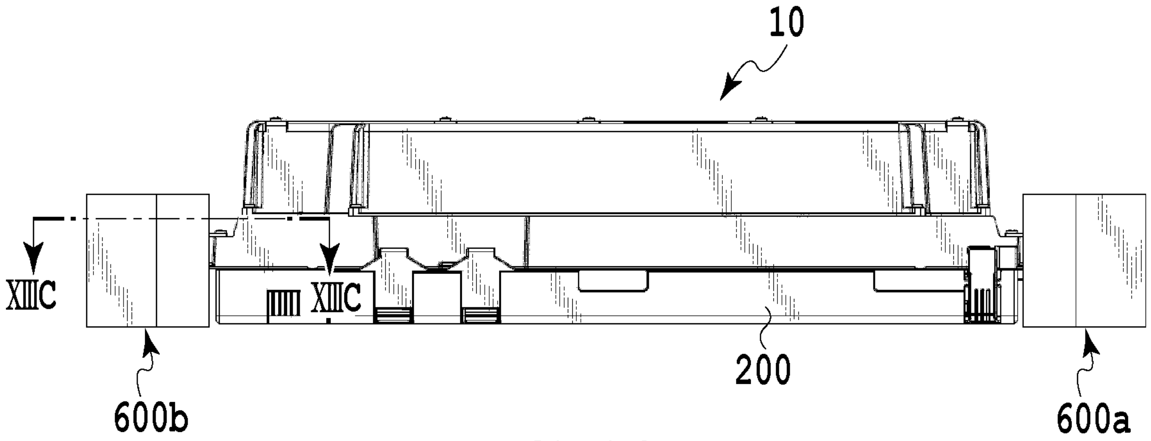
Figure 13C:
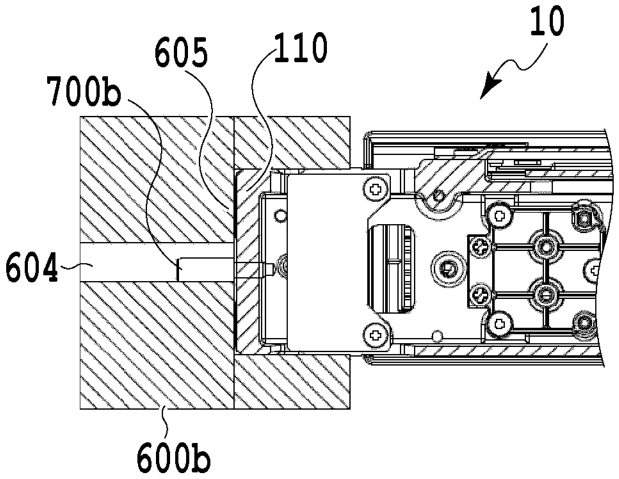
Figure 13D:
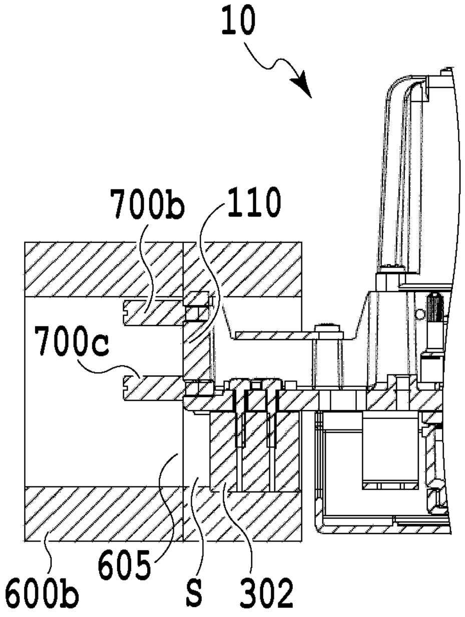

FIG. 13A is a top view of the liquid ejection head 10 according to the present embodiment with the cushioning materials 600*a* and 600*b* attached to one end and the other end, respectively, and FIG. 13B is a side view of the same. FIG. 13C is a cross-sectional view of the XIIIC-XIIIC line cross section of FIG. 13B, and FIG. 13D is a cross-sectional view of the XIIID-XIIID line cross section of FIG. 13A.

The first cushioning material 600*a* and the second cushioning material 600*b* are attached to regulate the protective member 200 mounted to the liquid ejection head 10. In other words, as illustrated in FIG. 13B, the cushioning materials 600*a* and 600*b* are respectively positioned near both ends of the protective member 200 in the longitudinal direction. Further, as illustrated in FIG. 13A to FIG. 13D, the range of the cushioning materials 600*a* and 600*b* in the direction orthogonal to the longitudinal direction of the protective member 200 is larger than the range where the protective member 200 is present. As a result, even in a case where some external force acts on the liquid ejection head 10 with the protective member 200 mounted, the external force is absorbed by the cushioning materials 600*a* and 600*b*, preventing the external force from acting directly on the protective member 200. For example, even if the liquid ejection head 10 is dropped, the first and second cushioning materials 600*a* and 600*b* absorb the shock and prevent the shock from acting directly on the protective member 200. In addition, even if the protective member 200 is made detached from the liquid ejection head 10, movement of the protective member 200 is restricted by the cushioning material positioned nearby. Furthermore, the pins 700*a* and 700*b* protruding from the end portions of the liquid ejection head 10 are contained in the cushioning materials 600*a* and 600*b*, which prevents the container bag from being torn by protrusions such as the pins in the liquid ejection head 10 in a case of receiving shocks such as being dropped.

In addition to the shock absorption by the cushioning materials 600*a* and 600*b* themselves as described above, the present embodiment further has the following shock absorption structure. As illustrated in FIG. 13D, the present embodiment is configured to form the space S between the positioning member 302 and the contacting surface 605 of the cushioning material 600*b*. As a result, even if the material is accidentally dropped in the longitudinal direction, the shock to the members 110 of the liquid ejection head is suppressed by the cushioning material. On the other hand, the positioning members do not come into contact with the cushioning material, thus allowing prevention of an effect on attachment accuracy.

In this way, as illustrated in FIG. 11 and FIG. 13A to FIG. 13C, the cushioning materials 600*a* and 600*b* are arranged in close proximity to both ends of the protective member 200 in the longitudinal direction. Furthermore, the bag member 800 is fixed to the liquid ejection head 10 by depressurizing the bag member 800, as illustrated the later-described FIG. 14A and FIG. 14B. As a result, movement of the protective member 200 in the longitudinal direction is restricted, preventing removal. Further, the cushioning materials 600*a* and 600*b* are configured to cover the corner portions and the pins at both ends of the liquid ejection head 10, so that even if external forces such as vibration or dropping are applied during transportation, damage to the bag member due to the corners and the pins at both ends is suppressed. Therefore, with that configuration, the depressurized state of the bag member 800 is maintained, and the protective member cannot be removed.

Figure 14A:
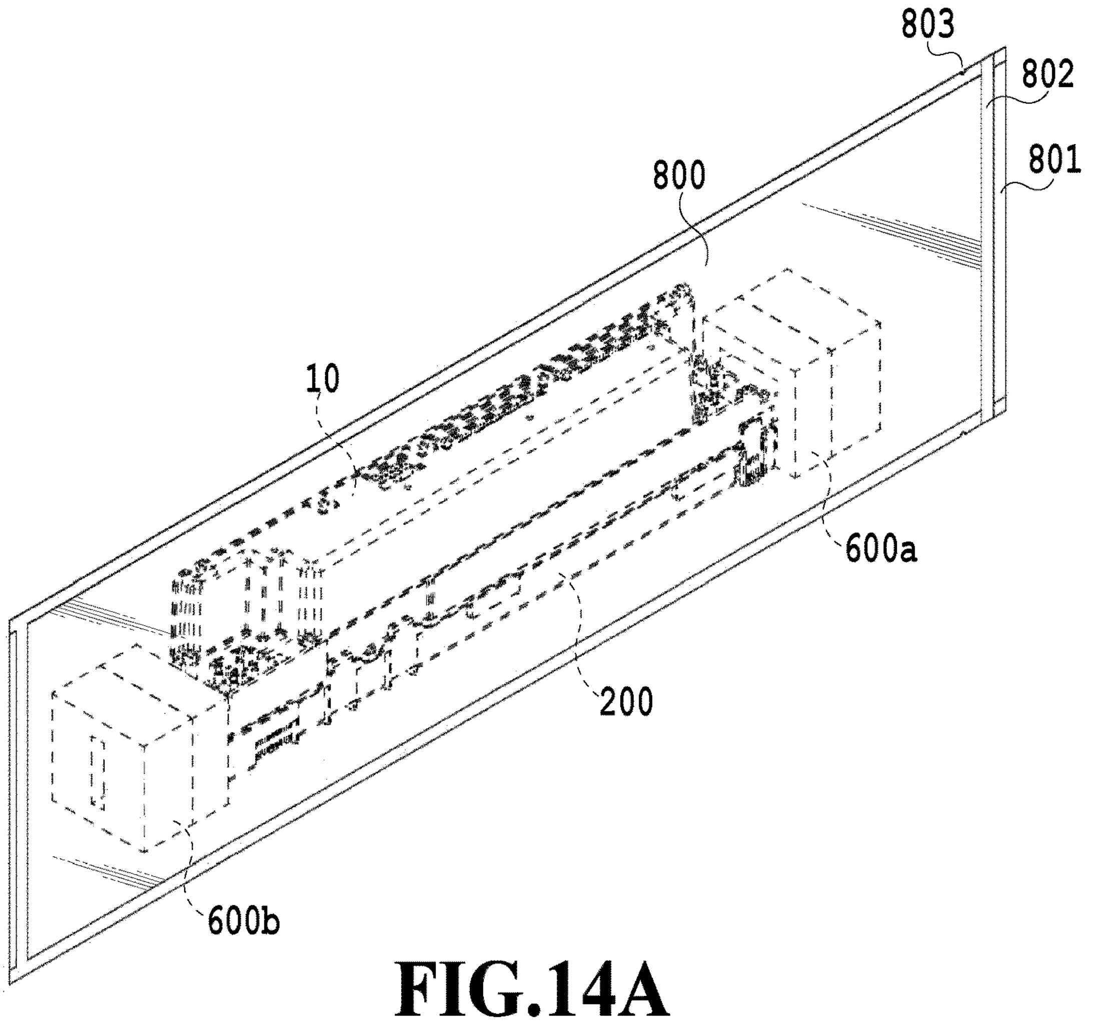
FIG. 14A and FIG. 14B are a perspective view of the liquid ejection head in a state inserted into a bag member, and an explanatory diagram for explaining a state where the bag member is internally depressurized and sealed.
Figure 14B:
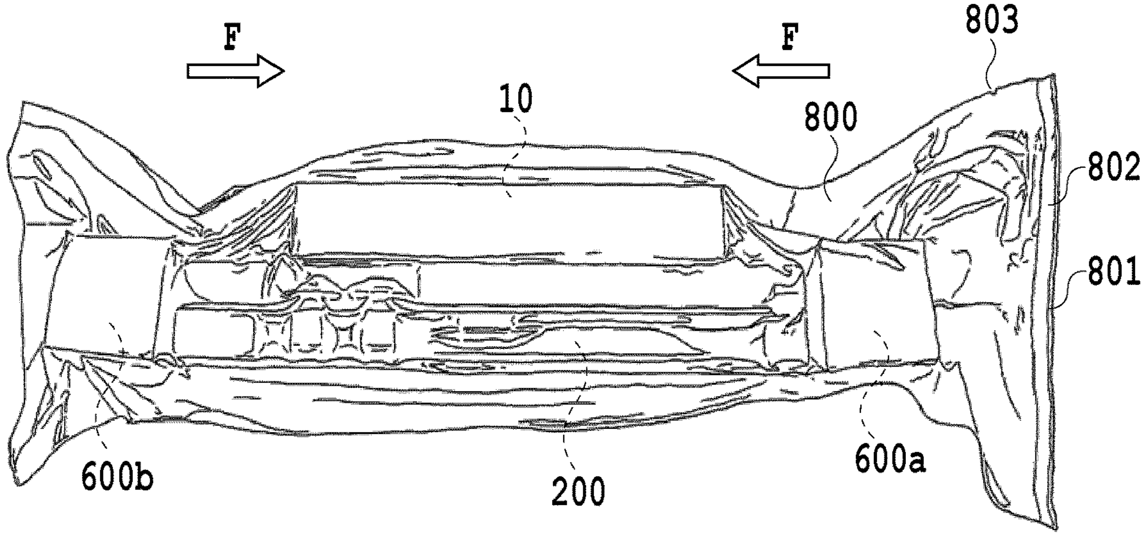
Figure 15:
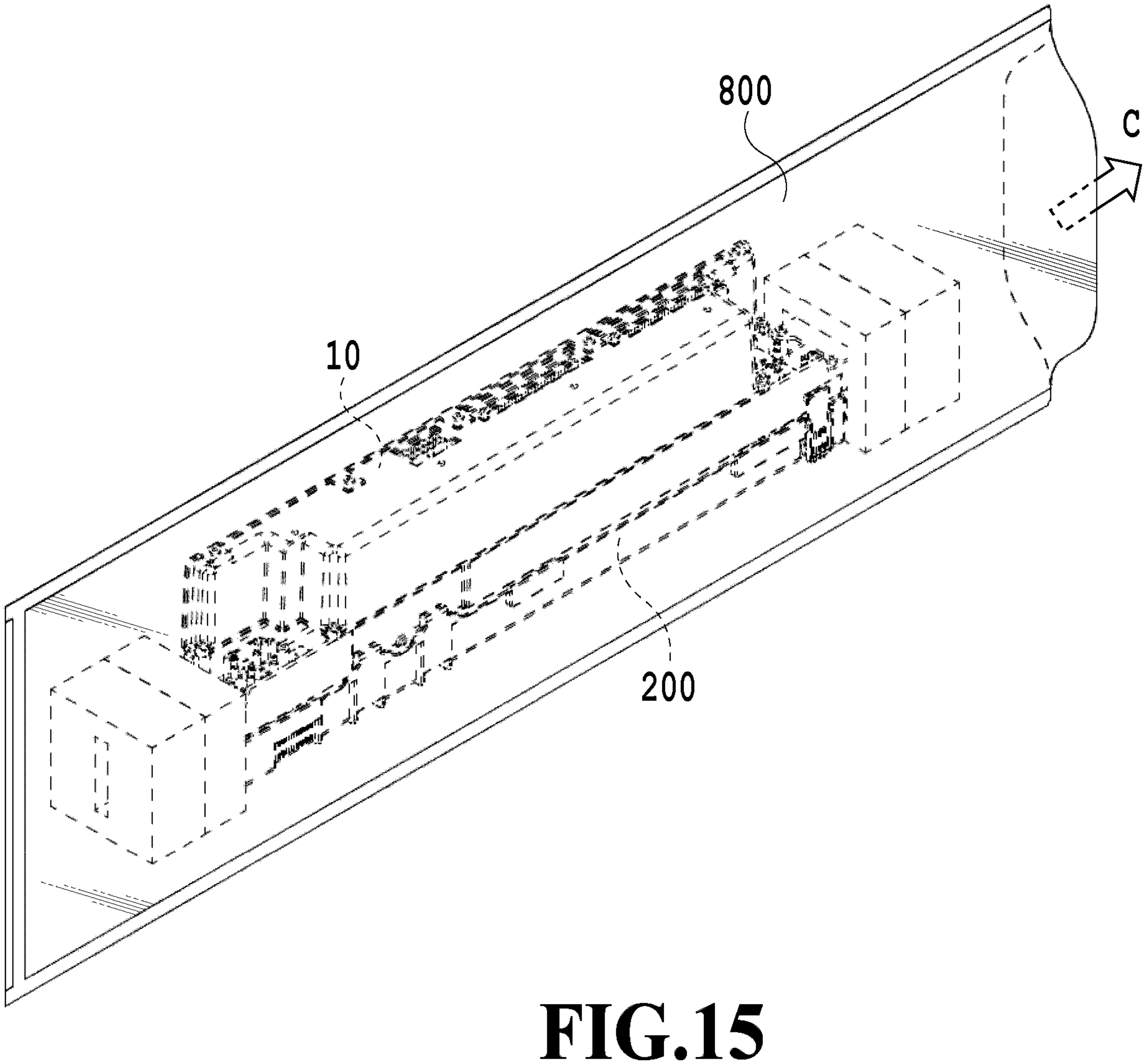
FIG. 15 is a perspective view of a state where the bag member of the liquid ejection head according to one embodiment of the present disclosure is opened.

FIG. 14A is a perspective view of the liquid ejection head 10 in a state inserted into the bag member 800, and FIG. 14B is an explanatory diagram for explaining a state in which the bag member 800 is internally depressurized and sealed. FIG. 15 is a perspective view of a state where the bag member 800 of the liquid ejection head 10 in the present embodiment is opened.

The liquid ejection head 10 of the present embodiment is contained in the bag member 800, as illustrated in FIG. 14A. In the present embodiment, the bag member 800 is a three-way welded bag and has the opening 801. The liquid ejection head 10 is inserted into the bag member 800 through the opening 801. The inside of the bag member 800 is then depressurized and the opening 801 is thermally welded to form the thermally welded portion 802, which seals the bag member 800. As illustrated in FIG. 14B, depressurizing the bag member 800 internally reduces the space inside the bag member 800, and the bag member 800 adheres closely to the liquid ejection head 10 and the cushioning materials 600*a* and 600*b*. As a result, the cushioning materials 600*a* and 600*b* are pressed against the liquid ejection head 10 and are nearly fixed. The cushioning materials 600*a* and 600*b* are mounted in close proximity to both ends of the protective member 200 in the longitudinal direction and, by being fixed, sliding movement of the protective member 200 is regulated in the longitudinal direction. In that case, depressurizing is performed until the bag member 800 is in a state pressing the cushioning material 600 against the liquid ejection head 10. The cushioning materials 600*a* and 600*b* are pressed against and nearly fixed to the liquid ejection head 10 to further regulate movement of the protective member 200 in the longitudinal direction.

The protective member 200 is engaged with the liquid ejection head 10 by the fixing portion 202, but there is a possibility that the engagement may be loosened by external force or the like. In the present embodiment, even if the engagement between the fixing portion 202 of the protective member 200 and the fixation opening 103 is loosened, the protective member 200 falling out during transportation can be suppressed by the regulation of the cushioning material 600*a* and the cushioning material 600*b*. Further, due to the presence of the second through hole 604 of the cushioning material 600 in the longitudinal direction of the liquid ejection head 10, the air on the distal side of the bag member 800, opposite to the opening 801, is also depressurized. This allows depressurizing of the inside of the bag member 800.

Further, as illustrated in FIG. 14B, the force F is applied to each of the cushioning material 600*a* and the cushioning material 600*b* in the liquid ejection head 10 due to depressurizing. Then, regarding the liquid ejection head 10, the bag member 800 can easily adhere to the liquid ejection head 10 and the protective member 200 without forming a large depressurized space between the cushioning materials at both ends during depressurization, making it easier to press and fix the cushioning material onto the liquid ejection head.

Further, the bag member 800 has an opening unit for opening an end portion in the longitudinal direction. In the present embodiment, the opening unit is the notch 803, and the notch 803 (see FIG. 14A) is installed at an end portion in the direction the protective member 200 is fixed to the liquid ejection head 10. The notch 803 serves as a trigger for opening the bag member 800 and assists in opening the bag member 800. After opening the bag member 800, in a case of taking out the liquid ejection head 10 in the bag member 800, the liquid ejection head 10 can be taken out by moving the liquid ejection head (the arrow C). Specifically, by opening the first direction (the arrow X) side illustrated in FIG. 6A, the direction of movement of the liquid ejection head 10 and the direction of removal of the protective member are the same, and thus the liquid ejection head can be taken out without the protective member coming off, as illustrated in FIG. 15. Therefore, the recording element substrates 100 can be protected even during the operation of taking out the liquid ejection head 10 from the bag member 800.

Second Embodiment

An explanation is herein given of the second embodiment of the present disclosure. Explanations of functions and configurations similar to the first embodiment of the present disclosure are omitted, and only the different points are explained.

FIG. 16A and FIG. 16B are a perspective view and a side view of the liquid ejection head 10 and a mounted cushioning material in the second embodiment. In the first embodiment, the cushioning material is formed by thermally welding two members, but the present disclosure is not limited as such. As illustrated in FIG. 16A and FIG. 16B, the cushioning material 1600 has the first member 601, the second member 602, and the third member 606. The first member 601, the second member 602, and the third member 606 are each thermally welded and bonded. The third member 606 is fixed so as to cover the fixing portion 202 of the protective member 200. This ensures that the fixing portion 202 of the protective member is pressed against the liquid ejection head 10 inside the depressurized bag member 800 and that the protective member 200 is fixed without the fixing portion 202 loosening.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-095765, filed Jun. 9, 2023, which is hereby incorporated by reference wherein in its entirety.

What is claimed is:

1. A packaging form for packaging a liquid ejection head equipped with a detachably attachable protective member, the packaging form comprising:

the protective member configured to cover an ejection port surface of the liquid ejection head;

cushioning material configured to be mounted on both ends of the liquid ejection head in a longitudinal direction, the cushioning material including a through hole in the longitudinal direction of the liquid ejection head, the through hole including a contacting surface for making contact with the liquid ejection head; and a bag member configured to package the liquid ejection head, wherein the liquid ejection head, the protective member, and the cushioning material fixed together are contained inside the bag member and sealed in a depressurized state.

2. The packaging form for packaging the liquid ejection head according to claim 1, wherein, to remove the protective member, the protective member is moved in the longitudinal direction relative to the liquid ejection head.

3. The packaging form for packaging the liquid ejection head according to claim 1, wherein the cushioning material is arranged in an area that restricts a movable area of the protective member.

4. The packaging form for packaging the liquid ejection head according to claim 1, wherein the cushioning material contains a protruding portion of the liquid ejection head in the longitudinal direction inside the through hole.

5. The packaging form for packaging the liquid ejection head according to claim 1, wherein both ends in the longitudinal direction of the liquid ejection head include a positioning portion for positioning the liquid ejection head onto a liquid ejection apparatus.

6. The packaging form for packaging the liquid ejection head according to claim 5, wherein the contacting surface of the cushioning material is configured such that, in least in the longitudinal direction, the cushioning material does not abut the positioning portion at least in the longitudinal direction.

7. The packaging form for packaging the liquid ejection head according to claim 1, wherein the cushioning material includes a first cushioning member bonded to a second cushioning member, the first cushioning member having a first hole portion and the second cushioning member having a second hole portion, the first hole portion and the second hole portion having different opening areas, the through hole of the cushioning material being defined by the first hole portion and the second hole portion.

8. The packaging form for packaging the liquid ejection head according to claim 7, wherein the first cushioning member and the second cushioning member are bonded by thermal welding.

9. The packaging form for packaging the liquid ejection head according to claim 1, wherein the cushioning material presses against an engaging portion that engages with the liquid ejection head to regulate movement of the protective member in the longitudinal direction.

10. The packaging form for packaging the liquid ejection head according to claim 1, wherein the bag member includes an opening unit for opening an end portion of the longitudinal direction.

11. The packaging form for packaging the liquid ejection head according to claim 10, wherein the opening unit is installed at an end portion in a direction the protective member is fixed to the liquid ejection head.

12. A packaging form for packaging a liquid ejection head equipped with a detachably attachable protective member, the packaging form comprising:

the protective member configured to cover an ejection port surface of the liquid ejection head;

cushioning material configured to be mounted on both ends of the liquid ejection head in a longitudinal direction, the cushioning material including a through hole in the longitudinal direction of the liquid ejection head, the cushioning material contains a protruding portion of the liquid ejection head in the longitudinal direction inside the through hole; and a bag member configured to package the liquid ejection head, wherein the liquid ejection head, the protective member, and the cushioning material fixed together are contained inside the bag member and sealed in a depressurized state.

13. A packaging form for packaging a liquid ejection head equipped with a detachably attachable protective member, the packaging form comprising:

the protective member configured to cover an ejection port surface of the liquid ejection head;

cushioning material configured to be mounted on both ends of the liquid ejection head in a longitudinal direction, the cushioning material including a first cushioning member bonded to a second cushioning member, the first cushioning member having a first hole portion and the second cushioning member having a second hole portion, the first hole portion and the second hole portion having different opening areas, the first hole portion and the second hole portion defining a through hole in the longitudinal direction of the liquid ejection head; and a bag member configured to package the liquid ejection head, wherein the liquid ejection head, the protective member, and the cushioning material fixed together are contained inside the bag member and sealed in a depressurized state.

14. The packaging form for packaging the liquid ejection head according to claim 13, wherein the first cushioning member and the second cushioning member are bonded by thermal welding.

* * * * *